United States Patent
Zhang et al.

(10) Patent No.: US 11,932,576 B2
(45) Date of Patent: Mar. 19, 2024

(54) ALUMINOSILICATE GLASS COMPOSITION, ALUMINOSILICATE GLASS, PREPARATION METHOD THEREFOR AND APPLICATION THEREOF

(71) Applicants: TUNGHSU TECHNOLOGY GROUP CO., LTD., Beijing (CN); TUNGHSU GROUP CO., LTD., Hebei (CN)

(72) Inventors: Guangtao Zhang, Hebei (CN); Wenmei Han, Hebei (CN); Zhiyong Li, Hebei (CN); Gang Li, Hebei (CN); Junfeng Wang, Hebei (CN); Dongcheng Yan, Hebei (CN); Lihong Wang, Hebei (CN)

(73) Assignees: TUNGHSU TECHNOLOGY GROUP CO., LTD., Beijing (CN); TUNGHSU GROUP CO., LTD., Hebei (CN)

( * ) Notice: Subject to any disclaimer, the term of this patent is extended or adjusted under 35 U.S.C. 154(b) by 279 days.

(21) Appl. No.: 17/285,986

(22) PCT Filed: Oct. 16, 2019

(86) PCT No.: PCT/CN2019/111445
§ 371 (c)(1),
(2) Date: May 14, 2021

(87) PCT Pub. No.: WO2020/078377
PCT Pub. Date: Apr. 23, 2020

(65) Prior Publication Data
US 2021/0340056 A1   Nov. 4, 2021

(30) Foreign Application Priority Data

Oct. 16, 2018 (CN) .......................... 201811203508.6

(51) Int. Cl.
*C03C 3/095* (2006.01)
*C03B 25/02* (2006.01)

(52) U.S. Cl.
CPC .............. *C03C 3/095* (2013.01); *C03B 25/02* (2013.01)

(58) Field of Classification Search
CPC ................................ C03C 3/095; C03C 3/087
See application file for complete search history.

(56) References Cited

U.S. PATENT DOCUMENTS 6,465,381 B1   10/2002  Lautenschläger
2009/0286091 A1   11/2009  Danielson

FOREIGN PATENT DOCUMENTS

| | | |
|---|---|---|
| CN | 1559945 A | 8/2004 |
| CN | 102066273 A | 5/2011 |
| CN | 102951840 A | 3/2013 |
| CN | 103910487 A | 7/2014 |
| CN | 104136383 A | 11/2014 |
| CN | 105502929 A | 4/2016 |
| CN | 105601105 A | 5/2016 |
| CN | 105859127 A | 8/2016 |
| CN | 105859129 A | 8/2016 |
| CN | 107129142 A | 9/2017 |
| CN | 108341595 A | 7/2018 |
| CN | 109160727 A | 1/2019 |
| CN | 109231819 A | 1/2019 |
| EP | 0665192 A1 | 1/1995 |
| JP | 2001048573 A | 2/2001 |
| JP | 2011522767 A | 8/2011 |
| JP | 2012184146 A | 9/2012 |
| JP | 2016074551 A | 5/2016 |
| JP | 2016113363 A | 6/2016 |
| JP | 2021512843 A | 5/2021 |
| WO | 2012103194 A1 | 8/2012 |

OTHER PUBLICATIONS

Glass Production Process Technology, 1st edition, Dec. 2013, Wang Wei et al., Wuhan University of Technology Press, p. 45.
International Preliminary Report on Patentability for PCT Appl. No. PCT/CN2019/11144 dated Apr. 29, 2021, 9 pages.
Search Report by Registered Search Organization for Patent Appl. No. JP2021-521014 dated Jun. 20, 2022, 27 pages.
Notice of Reasons for Refusal for Patent Appl. No. JP2021-521014 dated Jul. 19, 2022, 14 pages.
Supplementary European Search Report for EP Application No. 19872783, dated Nov. 17, 2021, 4 pages.
International Search Report and Written Opinion for PCT Appl. No. PCT/CN2019/111445, dated Jan. 6, 2020, 8 Pages.
International Search Report and Written Opinion for PCT Appl. No. PCT/CN2019/111444, dated Jan. 3, 2020, 9 Pages.

*Primary Examiner* — Elizabeth A. Bolden
(74) *Attorney, Agent, or Firm* — Maine Cernota & Curran

(57) ABSTRACT

The present invention discloses an aluminosilicate glass composition, aluminosilicate glass and a preparation method therefor and application thereof. Based on the total molar weight of the aluminosilicate glass composition, the aluminosilicate glass composition comprises, by oxide, 67-74 mol % of $SiO_2$, 10-15 mol % of $Al_2O_3$, 0-5 mol % of $B_2O_3$, 1-10 mol % of MgO, 1-10 mol % of CaO, 0-3 mol % of SrO, 2-8 mol % of BaO, 0.1-4 mol % of ZnO, 0.1-4 mol % of $RE_2O_3$ and less than 0.05 mol % of $R_2O$, wherein RE represents rare earth elements, and R represents alkali metals.

17 Claims, No Drawings

ALUMINOSILICATE GLASS COMPOSITION, ALUMINOSILICATE GLASS, PREPARATION METHOD THEREFOR AND APPLICATION THEREOF

RELATED APPLICATIONS

This application is a national phase application filed under 35 USC § 371 of PCT Application No. PCT/CN2019/111445 with an International filing date of Oct. 16, 2019. Application PCT/CN2019/111445 claims Chinese Application No. 201811203508.6, filed Oct. 16, 2018. Both of these applications are incorporated herein by reference in their entirety for all purposes.

FIELD OF THE INVENTION

The present invention relates to the field of glass manufacturing, in particular to an aluminosilicate glass composition, aluminosilicate glass, a preparation method therefor and application thereof.

BACKGROUND OF THE INVENTION

As the optoelectronic industry rapidly develops, there is an increasing need for various display devices, e.g., active-matrix liquid crystal display (AMLCD), organic light emitting diode (OLED) and low temperature poly silicon active-matrix liquid crystal display (LTPS TFT-LCD), which are all based on a technology of producing thin film transistors (TFTs) with thin-film semiconductor materials. Mainstream silicon-based TFTs can be classified into amorphous silicon (a-Si) TFTs, polycrystalline silicon (p-Si) TFTs and single crystal silicon (SCS) TFTs, among which a-Si TFTs are a technology applied by current mainstream TFT-LCDs. As for the a-Si TFT technology, the treatment temperature in a production process can be in the range of 300-450° C. LTPS polycrystalline silicon (p-Si) TFTs need to be treated a plurality of times at a relatively high temperature in a manufacturing process, substrates should be free from deformation during the plurality of times of high-temperature treatment, and consequently, higher requirements on performance of substrate glass are made, preferably a strain point is higher than 650° C., more preferably the strain point is higher than 670° C., 700° C. and 720° C., so the substrates may suffer thermal shrinkage as little as possible in a panel manufacturing process. Concurrently, a coefficient of expansion of the glass substrates needs to be similar to that of silicon in order to reduce strain and damage as much as possible, accordingly a preferred coefficient of linear thermal expansion of the substrate glass is in the range of $28\text{-}39\times10^{-7}/°$ C. To facilitate production, glass for display substrates should have a relatively low liquidus temperature.

As for glass substrates for panel display, sputtering, chemical vapor deposition (CVD) and other technologies need to be adopted to form transparent conductive films, insulating films, semiconductor (p-Si, a-Si, etc.) films and metal films on surfaces of underlying substrate glass, and a photo-etching technology is then adopted to form various circuits and patterns. If glass contains alkali metal oxides ($Na_2O$, $K_2O$, $Li_2O$), alkali metal ions may spread into deposited semiconductor materials in a heat treatment process to damage properties of semiconductor films, accordingly the glass should be free from alkali metal oxides, preferably the glass is alkaline earth aluminosilicate glass that contains main components, e.g., $SiO_2$, $Al_2O_3$, $B_2O_3$ and alkaline earth metal oxides RO (RO=Mg, Ca, Sr).

During processing of glass substrates, substrate glass is horizontally positioned and, under the action of self-weight, droops by a certain degree which is in direct proportion to a density of glass and in inverse proportion to an elasticity modulus of glass. Because larger and thinner substrates need to be manufactured, it must be brought into attention that glass plates droop during manufacturing. Therefore, composition should be designed, so substrate glass may have a density as low as possible and an elasticity modulus as high as possible.

In some flat panel display manufacturing processes, ultraviolet rays are needed to be used as energy to separate display units from substrate glass in contact with the display units. In order to reduce the cost for separation and increase the success rate, glass substrates need to have a relatively high and stable penetration rate in an ultraviolet region, for example, for glass substrates with thickness of 0.5 mm, it is required that the penetration rate is higher than 60% at the wavelength of 308 nm and/or 343 nm, and the range of penetration rates of different glass substrates in the same batch is within 1%. Nevertheless, due to inevitable factors, components, e.g., $SO_3$, $Fe_3O_4$ and $Cr_2O_3$, which have strong absorbability in the ultraviolet region may be introduced more or less in the manufacturing process of glass substrates, and thus contents of various impurity components need to be strictly controlled in the manufacturing process of glass substrates. On the other hand, iron ions at different valence states have different absorbability on ultraviolet rays, as a result, by controlling the valence state of iron and completing clarifying and homogenizing treatment in a certain way in the manufacturing process of glass, glass substrates with high penetration rate at 308 nm and/or 343 nm are easy to manufacture.

SUMMARY OF THE INVENTION

An objective of the present invention is to provide an aluminosilicate glass and a preparation method therefor and application thereof in order to overcome the defects that existing aluminosilicate glass has no ideal glass homogenizing effect on display substrates and is relatively low in penetration rate at 308 nm. The aluminosilicate glass has a relatively low density and a relatively high elasticity modulus, good thermal stability and a relatively low thermal shrinkage rate and also has a high penetration rate at 308 nm and/or 343 nm.

In order to realize the objective, a first aspect of the present invention provides an aluminosilicate glass composition. Based on the total molar weight of the aluminosilicate glass, the aluminosilicate glass comprises, by oxide, 67-74 mol % of $SiO_2$, 10-15 mol % of $Al_2O_3$, 0-5 mol % of $B_2O_3$ 1-10 mol % of MgO, 1-10 mol % of CaO, 0-3 mol % of SrO, 2-8 mol % of BaO, 0.1-4 mol % of ZnO, 0.1-4 mol % of $RE_2O_3$ and less than 0.05 mol % of $R_2O$, wherein RE represents rare earth elements, and R represents alkali metals.

Preferably, based on the total molar weight of the aluminosilicate glass composition, the aluminosilicate glass composition comprises, by oxide, 69-72 mol % of $SiO_2$, 12-14 mol % of $Al_2O_3$, 0-2 mol % of $B_2O_3$, 4-7 mol % of MgO, 4-7 mol % of CaO, 0-2 mol % of SrO, 3-6 mol % of BaO, 0.5-1.5 mol % of ZnO, 0.1-1.5 mol % of $RE_2O_3$ and less than 0.05 mol % of $R_2O$.

Preferably, by molar percentage, $B_2O_3/(B_2O_3+SiO_2)<0.05$.

Preferably, by molar percentage, $B_2O_3/(MgO+CaO+SrO+BaO)<0.3$.

Preferably, the RE represents yttrium and lanthanides, and the R represents Li, Na and K.

Preferably, the RE represents Y, La and Lu.

Preferably, by molar percentage, $(SrO+BaO)/(MgO+CaO+SrO+BaO+ZnO+Y_2O_3+La_2O_3+Lu_2O_3)>0.3$.

Preferably, the aluminosilicate glass composition further comprises clarifying agent(s), and based on the total molar weights of all the components, the content of the clarifying agent(s) is 0.5 mol % or less, more preferably the content of the clarifying agent is 0.3 mol % or less.

In a second aspect, the present invention provides a method for the preparation of aluminosilicate glass. The method comprises: taking raw materials required by the aluminosilicate glass composition for mixing to obtain a mixture M1, adding $NH_4NO_3$ into the M1 to obtain a mixture M2, and performing melting treatment, annealing treatment and machining treatment on the mixture M2 to prepare the aluminosilicate glass. Based on 100 g of the obtained aluminosilicate glass, the addition amount of $NH_4NO_3$ is 5-15 g.

In a third aspect, the present invention provides aluminosilicate glass prepared by the method.

Preferably, an oxygen ion concentration Vo of the aluminosilicate glass is 0.08 mol/cm³ or higher, further preferably the Vo is 0.084 mol/cm³ or higher, more preferably the Vo is 0.086 mol/cm³ or higher;

$$V_o=[(2*N_{Si}+3*N_{Al}+3*N_B+N_{Mg}+N_{Ca}+N_{Sr}+N_{Ba}+N_{Zn}+3*N_{NH4}+3*N_Y+3*N_{La}+3*N_{Lu})/(N_{Si}+N_{Al}+N_B+N_{Mg}+N_{Ca}+N_{Sr}+N_{Ba}+N_{Za}+N_Y+N_{La}+N_{Lu})]/(m_o/\rho),$$

wherein based on 100 g of the obtained aluminosilicate glass, $N_{Si}$, $N_{Al}$, $N_B$, $N_{Mg}$, $N_{Ca}$, $N_{Sr}$, $N_{Ba}$, $N_{Zn}$, $N_Y$, $N_{La}$ and $N_{Lu}$ represent the amounts of substances of $SiO_2$, $Al_2O_3$, $B_2O_3$, MgO, CaO, SrO, BaO, ZnO, $Y_2O_3$, $La_2O_3$ and $Lu_2O_3$, in the mixture M1, respectively; $NNH_4$ represents the amount of substance of $NH_4NO_3$ added into the M1; $m_o$ represents the mass of the aluminosilicate glass obtained after melting the mixture M2 and has a unit of g; and $\rho$ represents the density of the obtained aluminosilicate glass and has a unit of g/cm³.

Preferably, a temperature T100 corresponding to 100 P viscosity of the aluminosilicate glass is 1680° C. or higher.

Preferably, a strain point Tst of the aluminosilicate glass is 740° C. or higher.

Preferably, a liquidus temperature TL of the aluminosilicate glass is 1240° C. or lower.

Preferably, a content of sulfur element, represented in the form of elemental sulfur S, in the aluminosilicate glass is less than 100 ppm.

Preferably, a content of iron oxide, represented in the form of $Fe_2O_3$, in the aluminosilicate glass is less than 150 ppm.

Preferably, a content of chromium oxide, represented in the form of $Cr_2O_3$, in the aluminosilicate glass is less than 50 ppm.

Preferably, a density of the aluminosilicate glass is 2.75 g/cm 3 or lower, further preferably less than 2.7 g/cm³; a coefficient of thermal expansion at 50-350° C. is less than $40\times10^{-7}/°$ C., further preferably less than $39.5\times10^{-7}/°$ C.; a Young's modulus is greater than 80 GPa, further preferably greater than 83 GPa.

Preferably, a temperature T100 corresponding to 100 P viscosity is in the range of 1690-1800° C., further preferably in the range of 1690-1710° C.; a temperature T35000 corresponding to 35000P viscosity of is in the range of 1250-1350° C., further preferably in the range of 1265-1310° C.; a strain point Tst is in the range of 740-765° C., further preferably in the range of 750-765° C.; a liquidus temperature TL is less than 1220° C.

Preferably, a transmittance at the wavelength of 308 nm is 72% or higher, further preferably 74% or higher; a transmittance at the wavelength of 343 nm is 84% or higher, further preferably 86% or higher; a transmittance at the wavelength of 550 nm is 91% or higher, further preferably 92% or higher.

Preferably, a thermal shrinkage rate Yt under the condition of 600° C./10 min is less than 10 ppm, further preferably less than 7 ppm.

In a fourth aspect, the present invention provides an application of the aluminosilicate glass composition or aluminosilicate glass of the present invention in preparation of display devices and/or solar cells, preferably in preparation of glass substrate materials and/or glass film materials for screen surface protection of flat panel display products, glass substrate materials and/or glass materials for surface packaging and/or glass film materials for screen surface protection of flexible display products, glass substrate materials of flexible solar cells, safety glass, bulletproof glass, intelligent automobile glass, intelligent traffic display screens, intelligent shop windows, intelligent cards and tickets and glass materials for other needs with high thermal stability, high ultraviolet transmittance and high mechanical stability.

The aluminosilicate glass of the present invention has the advantages of high ultraviolet transmittance, high visible light transmittance and high strain point (high thermal resistance). The aluminosilicate glass can be applied to preparation of display devices and/or solar cells, preferably suitable for the application fields of preparation of glass substrate materials and/or glass film materials for screen surface protection of flat panel display products, glass substrate materials and/or glass materials for surface packaging and/or glass film materials for screen surface protection of flexible display products, glass substrate materials of flexible solar cells, safety glass, bulletproof glass, intelligent automobile glass, intelligent traffic display screens, intelligent shop windows, intelligent cards and tickets and glass materials for other needs with high thermal stability, high ultraviolet transmittance and high mechanical stability.

DETAILED DESCRIPTION

The specific embodiments of the present invention will be described in detail below. It should be understood that the specific embodiments as described herein are only used for accounting for and interpreting the present invention, but not to limit the present invention.

In a first aspect, the present invention provides an aluminosilicate glass composition. Based on the total molar weight of the aluminosilicate glass composition, the aluminosilicate glass composition comprises, by oxide, 67-74 mol % of $SiO_2$, 10-15 mol % of $Al_2O_3$, 0-5 mol % of $B_2O_3$, 1-10 mol % of MgO, 1-10 mol % of CaO, 0-3 mol % of SrO, 2-8 mol % of BaO, 0.1-4 mol % of ZnO, 0.1-4 mol % of $RE_2O_3$ and less than 0.05 mol % of $R_2O$, wherein RE represents rare earth elements, and R represents alkali metals.

In a preferred embodiment of the present invention, based on the total molar weight of the aluminosilicate glass composition, the aluminosilicate glass composition comprises, by oxide, 69-72 mol % of $SiO_2$, 12-14 mol % of $Al_2O_3$, 0-2 mol % of $B_2O_3$, 4-7 mol % of MgO, 4-7 mol % of CaO, 0-2 mol % of SrO, 3-6 mol % of BaO, 0.5-1.5 mol % of ZnO, 0.1-1.5 mol % of $RE_2O_3$ and less than 0.05 mol % of $R_2O$.

In the aluminosilicate glass composition of the present invention, based on the total molar weight of the aluminosilicate glass composition, the content of $SiO_2$ can be, by oxide, in the range of 67-74 mol %, preferably in the range of 69-72 mol %, specifically the content of $SiO_2$ can be, e.g., 67 mol %, 67.3 mol %, 67.5 mol %, 67.7 mol %, 67.8 mol %, 68 mol %, 68.7 mol %, 69 mol %, 69.4 mol %, 70.8 mol %, 70.9 mol %, 71.8 mol %, 72 mol %, 72.4 mol %, 73.6 mol %, 73.9 mol %, 74 mol % and any numerical value in the range defined by any two of these numerical values. $SiO_2$ is a glass forming component. If the content of $SiO_2$ is too low, it may not contribute to enhancing chemical resistance, and cause a too high coefficient of expansion and a too low strain point, as a result, glass is prone to devitrification and also has a too low high-temperature resistivity and a weak Joule heat effect, and fails to meet the need for melting by the heating amount. The increasing content of $SiO_2$ contributes to reducing a coefficient of thermal expansion, raising a strain point, enhancing chemical resistance and improving high-temperature resistivity; a too high content of $SiO_2$ may, however, lead to the rise of a melting temperature of glass, the decrease of meltability, the rise of a liquid phase temperature and the decrease of devitrification resistance.

In the aluminosilicate glass composition of the present invention, based on the total molar weight of the aluminosilicate glass composition, the content of $Al_2O_3$ can be, by oxide, in the range of 10-15 mol %, preferably in the range of 12-14 mol %, specifically the content of $Al_2O_3$ can be, e.g., 10 mol %, 10.3 mol %, 10.9 mol %, 11 mol %, 11.7 mol %, 12 mol %, 12.6 mol %, 13 mol %, 13.3 mol %, 13.5 mol %, 13.6 mol %, 13.8 mol %, 13.9 mol %, 14 mol %, 14.4 mol %, 14.5 mol %, 14.9 mol %, 15 mol % and any numerical value in the range defined by any two of these numerical values. $Al_2O_3$ can improve the strength of glass structure. When the content of $Al_2O_3$ is less than 10 mol %, the thermal resistance of glass can hardly increase, and the glass is prone to erosion by external water and chemical reagents. A high content of $Al_2O_3$ contributes to raising annealing point of the glass and improving mechanical strength. Nevertheless, when the content of $Al_2O_3$ is greater than 15 mol %, the glass is prone to crystallization and difficult to melt.

In the aluminosilicate glass composition of the present invention, based on the total molar weight of the aluminosilicate glass composition, the content of $B_2O_3$ can be, by oxide, in the range of 0-5 mol %, preferably in the range of 0-2 mol %, specifically the content of $B_2O_3$ can be, e.g., 0, 0.4 mol %, 0.7 mol %, 1.4 mol %, 1.6 mol %, 1.9 mol %, 2 mol %, 2.5 mol %, 3.5 mol %, 4 mol %, 4.3 mol %, 4.7 mol %, 5 mol % and any numerical value in the range defined by any two of these numerical values. In a high-aluminum non-alkali aluminosilicate glass system, the use of boron oxide $B_2O_3$ can bring a good high-temperature fluxing effect, and at the same time, can contribute to improving the chemical resistance of glass. Nevertheless, in the range of low-temperature viscosity, $B_2O_3$ leads to an obvious drop of the annealing point of glass and does not contribute to improving the thermal stability of glass.

In the aluminosilicate glass composition of the present invention, based on the total molar weight of the aluminosilicate glass composition, the content of MgO can be, by oxide, in the range of 1-10 mol %, preferably in the range of 4-7 mol %, specifically the content of MgO can be, e.g., 1 mol %, 1.1 mol %, 1.2 mol %, 1.5 mol %, 1.8 mol %, 2.8 mol %, 3 mol %, 3.6 mol %, 4.4 mol %, 4.6 mol %, 5 mol %, 5.5 mol %, 6.4 mol %, 7 mol %, 7.4 mol %, 8 mol %, 9 mol %, 10 mol % and any numerical value in the range defined by any two of these numerical values.

In the aluminosilicate glass composition of the present invention, based on the total molar weight of the aluminosilicate glass composition, the content of CaO can be, by oxide, in the range of 1-10 mol %, preferably in the range of 4-7 mol %, specifically the content of CaO can be, e.g., 1 mol %, 1.1 mol %, 1.2 mol %, 1.5 mol %, 1.8 mol %, 2.1 mol %, 2.5 mol %, 3.8 mol %, 4.3 mol %, 4.9 mol %, 5.3 mol %, 5.7 mol %, 6.6 mol %, 7 mol %, 7.4 mol %, 8 mol %, 9 mol %, 10 mol % and any numerical value in the range defined by any two of these numerical values.

In the aluminosilicate glass composition of the present invention, based on the total molar weight of the aluminosilicate glass composition, the content of SrO can be, by oxide, in the range of 0-3 mol %, preferably in the range of 0-2 mol %, specifically the content of SrO can be, e.g., 0, 0.1 mol %, 0.44 mol %, 0.8 mol %, 1 mol %, 1.4 mol %, 1.5 mol %, 1.7 mol %, 2 mol %, 2.2 mol %, 2.6 mol %, 3 mol % and any numerical value in the range defined by any two of these numerical values.

In the present invention, MgO, CaO and SrO are all alkaline earth metal oxides, which can effectively reduce high-temperature viscosity of glass to improve meltability and formability of glass, and can also raise the annealing point of glass. In addition, MgO and SrO have the characteristics of improving chemical stability and mechanical stability, but a too high content of MgO and SrO may cause an increase of a density and an increase of occurrence rate of cracks, devitrification and phase splitting.

In the non-alkali aluminosilicate glass of the present invention, BaO serves as a flux and a component for preventing glass from crystallization. A too high content of BaO may cause an increase of high-temperature volume resistivity of glass, a too high density and a decrease of specific modulus of products. Although MgO, CaO, SrO and BaO are all alkaline earth metal oxides, it is found through experiments that each oxide may have a quite different influence on glass forming stability, and a proper increase of the content of BaO and controlling over a reasonable proportion range contribute to improving forming stability, improving crystallization resistance and optimizing overall performance. Therefore, with overall consideration, based on the total molar weight of the non-alkali aluminosilicate glass, the content of BaO is, by oxide, in the range of 2-8 mol %, preferably in the range of 3-6 mol %, specifically the content of BaO can be, e.g., 2 mol %, 2.3 mol %, 3.2 mol %, 3.5 mol %, 4.1 mol %, 4.9 mol %, 5.3 mol %, 5.9 mol %, 6.3 mol %, 6.9 mol %, 7 mol %, 7.3 mol %, 8 mol % and any numerical value in the range defined by any two of these numerical values.

In the aluminosilicate glass composition of the present invention, based on the total molar weight of the aluminosilicate glass composition, the content of ZnO can be, by oxide, in the range of 0.1-4 mol %, preferably in the range of 0.5-1.5 mol %, specifically the content of ZnO can be, e.g., 0.1 mol %, 0.14 mol %, 0.2 mol %, 0.25 mol %, 0.3 mol %, 0.4 mol %, 0.5 mol %, 0.6 mol %, 0.8 mol %, 0.9 mol %, 1 mol %, 1.2 mol %, 1.5 mol %, 2 mol %, 2.5 mol %, 3 mol %, 4 mol % and any numerical value in the range defined by any two of these numerical values. ZnO can reduce high-temperature viscosity (e.g., viscosity at 1500° C.) of glass and contribute to eliminating bubbles. Meanwhile, ZnO has, below a softening point, the effects of improving strength and hardness, increasing the chemical resistance of glass, and reducing the coefficient of thermal expansion of glass. In an non-alkali glass system, the addition of a proper amount of ZnO contributes to inhibiting crystallization and can lower the crystallization temperature.

Based on the total molar weight of the aluminosilicate glass composition, the content of $RE_2O_3$ can be, by oxide, 0.1-4 mol %, preferably 0.1-1.5 mol %, and the RE represents yttrium and lanthanide. In a specific embodiment of the present invention, the RE represents Y, La and Lu. Specifically, the content of $RE_2O_3$ can be, e.g., 0.1 mol %, 0.24 mol %, 0.28 mol %, 0.34 mol %, 0.4 mol %, 0.44 mol %, 0.8 mol %, 0.94 mol %, 0.96 mol %, 1.34 mol %, 1.4 mol %, 1.5 mol %, 2 mol %, 2.5 mol %, 3 mol %, 3.3 mol %, 3.5 mol %, 3.9 mol %, 4 mol % and any numerical value in the range defined by any two of these numerical values. In the composition for glass of the present invention, the rare earth oxide $RE_2O_3$ has a unique capacity of improving certain performance of glass, e.g., the addition of the rare earth oxide contributes to a sharp increase of the bending strength, elasticity modulus, strain point and other performance of glass, promotes a decrease of brittleness of glass and a sharp increase of fracture toughness, and can reduce the high-temperature viscosity and high-temperature volume resistivity of glass, thereby bringing great convenience to large industrial manufacturing of glass, particularly melting of glass by electric melting and/or electric boosting. After alkaline-earth metals, ZnO and other network modifiers are introduced into the composition of glass, surplus oxygen atoms enable oxo-bridged oxygen bonds in a glass structure to crack to generate non-bridging oxygens, and thus the bending strength of glass is substantially reduced by the presence of the non-bridging oxygens. The addition of $RE_2O_3$ promotes the change of an internal structure of glass and generates a chemical bond Si—O-RE to reconnect isolated island network units in glass, and thereby improving the network structure of glass, substantially improving the bending strength, elasticity modulus, strain point and chemical stability of glass and reducing high-temperature volume resistivity and other performance. Nevertheless, when $RE_2O_3$ is further increased, due to the decrease of adjustable non-bridging oxygens, the surplus $RE_2O_3$ has no great influence on the aforesaid performance of glass.

With overall consideration of thermal stability, high-temperature viscosity and glass forming stability, by molar percentage, $B_2O_3/(B_2O_3+SiO_2)<0.05$.

With overall consideration of thermal stability and high-temperature viscosity, by molar percentage, $B_2O_3/(MgO+CaO+SrO+BaO)<0.3$.

With overall consideration of glass forming stability, thermal stability and mechanical performance, by molar percentage, $(SrO+BaO)/(MgO+CaO+SrO+BaO+ZnO+Y_2O_3+La_2O_3+Lu_2O_3)>0.3$.

In the aluminosilicate glass composition of the present invention, the aluminosilicate glass composition further comprises clarifying agent(s), based on the total molar weights of all the components, the content of the clarifying agent(s) is 0.5 mol % or less, preferably 0.3 mol % or less.

In a second aspect, the present invention provides a method for the preparation of aluminosilicate glass. The method comprises:

taking raw materials required by the aluminosilicate glass composition for mixing to obtain a mixture M1, adding $NH_4NO_3$ into the M1 to obtain a mixture M2, and performing melting treatment, annealing treatment and machining treatment on the mixture M2 to prepare the aluminosilicate glass.

Based on 100 g of the obtained aluminosilicate glass, the addition amount of $NH_4NO_3$ is 5-15 g.

In the method of the present invention, preferably, the method further comprises: performing secondary melting and thinning treatment on the product obtained after machining treatment.

In a third aspect, the present invention provides aluminosilicate glass prepared by the method.

Preferably, the oxygen ion concentration Vo of the aluminosilicate glass is 0.08 mol/cm³ or more, preferably the Vo is 0.084 mol/cm³ or more, further preferably the Vo is 0.086 mol/cm³ or more;

$$V_o=[(2*N_{Si}+3*N_{Al}+3*N_B+N_{Mg}+N_{Ca}+N_{Sr}+N_{Ba}+N_{Zn}+3*N_{NH4}+3*N_Y+3*N_{La}+3*N_{Lu})/(N_{Si}+N_{Al}+N_B+N_{Mg}+N_{Ca}+N_{Sr}+N_{Ba}+N_{Za}+N_Y+N_{La}+N_{Lu})]/(m_o/\rho),$$

wherein based on 100 g of the obtained aluminosilicate glass, $N_{Si}$, $N_{Al}$, $N_B$, $N_{Mg}$, $N_{Ca}$, $N_{Sr}$, $N_{Ba}$, $N_{Zn}$, $N_Y$, $N_{La}$ and $N_{Lu}$ represent the amounts of substances of $SiO_2$, $Al_2O_3$, $B_2O_3$, MgO, CaO, SrO, BaO, ZnO, $Y_2O_3$, $La_2O_3$ and $Lu_2O_3$, in the mixture M1, respectively; $N_{NH4}$ represents the amount of substance of $NH_4NO_3$ added into the M1; $m_o$ represents the mass of the aluminosilicate glass obtained after melting the mixture M2 and has a unit of g; and $\rho$ represents the density of the obtained aluminosilicate glass and has a unit of g/cm³.

Preferably, a temperature T100 corresponding to 100 P viscosity of the aluminosilicate glass is 1680° C. or higher.

Preferably, a strain point Tst of the aluminosilicate glass is 740° C. or higher.

Preferably, a liquidus temperature TL of the aluminosilicate glass is 1240° C. or lower.

Preferably, a content of sulfur element, represented in the form of elemental sulfur S, in the aluminosilicate glass of the present invention is less than 100 ppm, further preferably a content of the sulfur element, represented in the form of elemental sulfur S, in the aluminosilicate glass of the present invention is less than 50 ppm.

Preferably, a content of iron oxide, represented in the form of $Fe_2O_3$, in the aluminosilicate glass of the present invention is less than 150 ppm.

Preferably, a content of chromium oxide, represented in the form of $Cr_2O_3$, in the aluminosilicate glass of the present invention is less than 50 ppm.

Preferably, a density of the aluminosilicate glass is 2.75 g/cm³ or lower, more preferably less than 2.65 g/cm³; a coefficient of thermal expansion at 50-350° C. is less than $40\times10^{-7}/°$ C., more preferably less than $39.5\times10^{-7}/°$ C.; a Young's modulus is greater than 80 GPa, more preferably greater than 83 GPa.

Preferably, a temperature T100 corresponding to 100 P viscosity of the aluminosilicate glass of the present invention is in the range of 1690-1800° C., more preferably in the range of 1690-1710° C.; a temperature T35000 corresponding to 35000P viscosity is in the range of 1250-1350° C., more preferably in the range of 1265-1310° C.; a strain point Tst is in the range of 740-765° C., more preferably in the range of 750-765° C.; a liquidus temperature TL less than 1220° C.

Preferably, a transmittance greater at the wavelength of 308 nm of the aluminosilicate glass of the present invention is 72% or higher, more preferably 74% or higher; a transmittance at the wavelength of 343 nm is 84% or higher, more preferably 86% or higher; a transmittance at the wavelength of 550 nm is 91% or higher, more preferably 92% or higher.

Preferably, a thermal shrinkage rate Yt under the condition of 600° C./10 min of the aluminosilicate glass of the present invention is less than 10 ppm, further preferably less than 7 ppm.

In a fourth aspect, the present invention provides application of the aluminosilicate glass composition or aluminosilicate glass of the present invention to preparation of display devices and/or solar cells, preferably application to preparation of glass substrate materials and/or glass film materials for screen surface protection of flat panel display products, glass substrate materials and/or glass materials for surface packaging and/or glass film materials for screen surface protection of flexible display products, glass substrate materials of flexible solar cells, safety glass, bulletproof glass, intelligent automobile glass, intelligent traffic display screens, intelligent shop windows, intelligent cards and tickets and glass materials for other needs with high thermal stability, high ultraviolet transmittance and high mechanical stability.

EXAMPLES

The present invention will be described in detail with reference to examples below. Unless otherwise specified, all the material used in examples below can be purchased. Unless otherwise specified, the methods applied are conventional methods in the art.

With reference to ASTM C-693, a density of glass is measured and has a unit of g/cm$^3$.

With reference to ASTM E-228, a coefficient of thermal expansion at 50-350° C. of glass is measured by a horizontal dilatometer and has a unit of $10^{-7}$/° C.

With reference to ASTM C-623, a Young's modulus of glass is measured and has a unit of GPa.

With reference to ASTM C-965, a high-temperature viscosity-temperature curve of glass is measured by a rotary high-temperature viscometer, wherein a temperature corresponding to 100 P viscosity is T100 and has a unit of ° C., and a temperature corresponding to X P viscosity is TX and has a unit of ° C.

With reference to ASTM C-829, a liquidus temperature TL of glass is measured by a temperature gradient furnace method and has a unit of ° C.

With reference to ASTM C-336, a strain point Tst of glass is measured by an annealing point and strain point tester and has a unit of ° C.

A transmittance of glass is measured by a Shimadzu UV-2600 ultraviolet and visible spectrophotometer, a glass sample is 0.5 mm thick, and the transmittances at 308 nm, 343 nm and 550 nm are taken respectively and have a unit of %.

A content of iron, represented in the form of $Fe_2O_3$, in glass is tested by a JY2000 inductively coupled plasma (ICP) emission spectrometer and has a unit of ppm.

A content of sulfur, represented in the form of S, in glass is tested by a CS-9900 infrared carbon sulfur analyzer and has a unit of ppm.

A thermal shrinkage rate after heat treatment is measured by the following heat treatment method (difference calculation method): heating glass (with an initial length measured and marked as L0) to 600° C. at a heating rate of 5° C./min from 25° C., keeping at 600° C. for 10 min, then cooling to 25° C. at a cooling rate of 5° C./min so that glass can shrink by a certain length, measuring the length of glass again and marking as Lt, and representing the thermal shrinkage rate Yt as:

$$Yt = \frac{L0 - Lt}{L0} * 100\%.$$

Examples 1-7

All the components are weighed as shown in Table 1 and evenly mixed, and the mixture is poured into a high zirconium brick crucible ($ZrO_2$>85 wt %), then heated in a resistant furnace at 1650° C. for 48 h, and slowly stirred at a constant speed by a platinum-rhodium alloy (80 wt % Pt+20 wt % Rh) stirrer. Molten glass is poured into stainless steel dies to form specified blocky glass products, the glass products are thereafter annealed for 2 h in an annealing furnace, the annealing furnace is powered off, and the glass products are cooled to 25° C. in the annealing furnace. The glass products are cut, ground and polished, then washed clean with deionized water and dried to prepare finished glass products with thickness of 0.5 mm. Various performance of each finished glass product is measured, and results are shown in Table 1.

Examples 8-15

Prepare according to the method of Example 1 and what is different is that the mixture composition (corresponding to the glass composition), and measurement results of performance of the obtained products are shown in Table 2.

Comparative Examples 1-7

Prepare according to the method of Example 1 and what is different is that the mixture composition (corresponding to the glass composition), and measurement results of performance of the obtained products are shown in Table 3.

TABLE 1

| Component (mol %) | Example 1 | Example 2 | Example 3 | Example 4 | Example 5 | Example 6 | Example 7 |
|---|---|---|---|---|---|---|---|
| $SiO_2$ | 68 | 68.7 | 69 | 69.4 | 70.8 | 70.9 | 67 |
| $Al_2O_3$ | 13.6 | 12.9 | 13.5 | 13 | 12 | 13.9 | 14.9 |
| $B_2O_3$ | 0 | 1.4 | 0 | 0.7 | 0.4 | 0 | 5 |
| MgO | 6.4 | 5 | 4.6 | 4.4 | 3 | 3.6 | 1 |
| CaO | 3.75 | 4.9 | 6.4 | 5.3 | 5.7 | 4.3 | 1 |
| SrO | 1.4 | 0.4 | 0 | 0.1 | 0.8 | 0 | 2.6 |
| BaO | 4.15 | 4.9 | 5.4 | 6.3 | 5.3 | 5.9 | 6.9 |
| ZnO | 1.2 | 0.8 | 0.6 | 0.4 | 0.9 | 1 | 0.1 |
| $SnO_2$ | 0.09 | 0.19 | 0.09 | 0.15 | 0.13 | 0.15 | 0.15 |
| $Y_2O_3$ | 0.7 | 0.2 | 0 | 0.14 | 0 | 0.1 | 0.2 |
| $La_2O_3$ | 0.4 | 0 | 0.4 | 0.1 | 0.36 | 0.14 | 0.84 |
| $Lu_2O_3$ | 0.3 | 0.6 | 0 | 0 | 0.6 | 0 | 0.3 |
| S (ppm) | 33 | 35 | 39 | 30 | 35 | 38 | 84 |
| $Fe_2O_3$ (ppm) | 98 | 105 | 90 | 98 | 80 | 96 | 129 |

TABLE 1-continued

| Component (mol %) | Example 1 | Example 2 | Example 3 | Example 4 | Example 5 | Example 6 | Example 7 |
|---|---|---|---|---|---|---|---|
| $NH_4NO_3$ (g) | 13 | 9 | 15 | 14 | 10 | 12 | 5 |
| Density (g/cm$^3$) | 2.68 | 2.68 | 2.66 | 2.67 | 2.69 | 2.65 | 2.74 |
| Expansion (×10$^{-7}$/° C.) | 37.5 | 36.7 | 39.0 | 39.2 | 38.4 | 36.5 | 38.1 |
| Young's modulus (GPa) | 86.7 | 84.7 | 85.1 | 84.3 | 82.6 | 83.1 | 80.5 |
| $T_{100}$ (° C.) | 1696 | 1692 | 1708 | 1695 | 1702 | 1704 | 1713 |
| $T_{35000}$ (° C.) | 1281 | 1295 | 1294 | 1268 | 1289 | 1303 | 1307 |
| $T_L$ (° C.) | 1190 | 1180 | 1190 | 1170 | 1180 | 1190 | 1220 |
| $T_{st}$ (° C.) | 756 | 753 | 752 | 754 | 757 | 762 | 743 |
| Oxygen ion concentration $V_0$ (mol/cm$^3$) | 0.0879 | 0.0838 | 0.0892 | 0.0881 | 0.0844 | 0.086 | 0.08 |
| Transmittance at 308 nm (%) | 75.3 | 74.4 | 75.7 | 76.2 | 74.9 | 75.7 | 72.6 |
| Transmittance at 343 nm (%) | 86.4 | 86.1 | 85.8 | 87.3 | 87.1 | 88 | 84.8 |
| Transmittance at 550 nm (%) | 92.1 | 92.3 | 92.2 | 92.4 | 92 | 92.3 | 91.3 |
| Thermal shrinkage rate $Y_t$ (ppm) | 6.7 | 6.2 | 6.7 | 6.1 | 5.6 | 4.8 | 8.9 |

TABLE 2

| Component (mol %) | Example 8 | Example 9 | Example 10 | Example 11 | Example 12 | Example 13 | Example 14 | Example 15 |
|---|---|---|---|---|---|---|---|---|
| $SiO_2$ | 67.5 | 67.8 | 67.3 | 72.4 | 67.7 | 71.1 | 73.5 | 73.9 |
| $Al_2O_3$ | 14.4 | 13.8 | 11.7 | 12 | 10.9 | 10 | 11 | 12.6 |
| $B_2O_3$ | 4.3 | 4.7 | 1.6 | 2.5 | 2 | 2 | 1.9 | 3.5 |
| MgO | 1.1 | 1.8 | 9 | 7.4 | 2.8 | 1 | 1.2 | 1.5 |
| CaO | 1.5 | 2.1 | 1 | 1.8 | 8 | 1 | 10 | 2.5 |
| SrO | 3 | 2.2 | 1.7 | 0 | 0 | 0.44 | 0 | 3 |
| BaO | 7.3 | 3.2 | 7 | 3 | 3.5 | 8 | 2.02 | 2.3 |
| ZnO | 0.3 | 0.25 | 0.2 | 0.3 | 4 | 3 | 0.14 | 0.25 |
| $SnO_2$ | 0.15 | 0.24 | 0.15 | 0.15 | 0.15 | 0.15 | 0.13 | 0.16 |
| $Y_2O_3$ | 0 | 2.3 | 0.34 | 0 | 0.2 | 3 | 0.1 | 0 |
| $La_2O_3$ | 0.44 | 1.6 | 0 | 0 | 0.6 | 0.3 | 0 | 0.28 |
| $Lu_2O_3$ | 0 | 0 | 0 | 0.44 | 0.14 | 0 | 0 | 0 |
| S (ppm) | 53 | 47 | 91 | 77 | 68 | 45 | 51 | 67 |
| $Fe_2O_3$ (ppm) | 146 | 137 | 133 | 127 | 122 | 111 | 146 | 120 |
| $NH_4NO_3$ (g) | 7 | 6 | 7 | 8 | 5 | 7 | 6 | 9 |
| Density (g/cm$^3$) | 2.49 | 2.72 | 2.72 | 2.53 | 2.71 | 2.75 | 2.49 | 2.52 |
| Expansion (×10$^{-7}$/° C.) | 28.8 | 39.4 | 39.1 | 29.4 | 39.2 | 35.7 | 33.7 | 29.8 |
| Young's modulus (GPa) | 82.3 | 83.3 | 85.2 | 83.9 | 82.4 | 81.4 | 81.5 | 81.2 |
| $T_{100}$ (° C.) | 1744 | 1743 | 1715 | 1781 | 1699 | 1766 | 1792 | 1741 |
| $T_{35000}$ (° C.) | 1331 | 1283 | 1282 | 1300 | 1284 | 1269 | 1297 | 1349 |
| $T_L$ (° C.) | 1240 | 1200 | 1200 | 1220 | 1230 | 1220 | 1230 | 1240 |
| $T_{st}$ (° C.) | 746 | 741 | 743 | 741 | 744 | 741 | 741 | 744 |
| Oxygen ion concentration $V_0$ (mol/cm$^3$) | 0.0812 | 0.0800 | 0.0814 | 0.0828 | 0.0802 | 0.0819 | 0.0805 | 0.0823 |
| Transmittance at 308 nm (%) | 73.3 | 73.7 | 73.8 | 73.9 | 72.2 | 72.8 | 73.4 | 73 |
| Transmittance at 343 nm (%) | 85.1 | 85.4 | 84.9 | 85.1 | 84.8 | 84.3 | 85.3 | 85.1 |
| Transmittance at 550 nm (%) | 91.6 | 91.1 | 91.2 | 91.7 | 91.5 | 91.6 | 91.5 | 91.1 |
| Thermal shrinkage rate $Y_t$ (ppm) | 8.5 | 9.4 | 7.9 | 8.4 | 8 | 8.5 | 8.7 | 8.1 |

TABLE 3

| Component (mol %) | Comparative example 1 | Comparative example 2 | Comparative example 3 | Comparative example 4 | Comparative example 5 | Comparative example 6 | Comparative example 7 |
|---|---|---|---|---|---|---|---|
| $SiO_2$ | 65.9 | 75.9 | 70.9 | 70.9 | 70.9 | 70.9 | 70.9 |
| $Al_2O_3$ | 18.9 | 8.9 | 13.9 | 13.9 | 13.9 | 13.9 | 13.9 |
| $B_2O_3$ | 0 | 0 | 6.9 | 0 | 0 | 0 | 0 |
| MgO | 3.6 | 3.6 | 3.6 | 3.6 | 3.6 | 3.6 | 3.6 |
| CaO | 4.3 | 4.3 | 4.3 | 4.3 | 4.3 | 4.3 | 4.3 |
| SrO | 0 | 0 | 0 | 0 | 0 | 0 | 0 |
| BaO | 5.9 | 5.9 | 0 | 5.9 | 5.9 | 5.9 | 5.9 |
| ZnO | 1 | 1 | 0 | 1 | 1.15 | 1.15 | 1 |
| $SnO_2$ | 0.15 | 0.15 | 0.15 | 0.13 | 0 | 0 | 0.15 |
| $Y_2O_3$ | 0.1 | 0.1 | 0.1 | 0.1 | 0.1 | 0.1 | 0.1 |
| $La_2O_3$ | 0.14 | 0.14 | 0.14 | 0.14 | 0.14 | 0.14 | 0.14 |
| $Lu_2O_3$ | 0 | 0 | 0 | 0 | 0 | 0 | 0 |
| S (ppm) | 38 | 38 | 38 | 38 | 800 | 800 | 38 |
| $Fe_2O_3$ (ppm) | 96 | 96 | 96 | 300 | 96 | 300 | 96 |
| $NH_4NO_3$ (g) | 12 | 12 | 12 | 12 | 12 | 12 | 0 |
| Density (g/cm$^3$) | 2.66 | 2.63 | 2.37 | 2.65 | 2.65 | 2.65 | 2.65 |
| Expansion ($\times 10^{-7}$/° C.) | 34.4 | 36.2 | 24.9 | 36.5 | 36.5 | 36.4 | 36.5 |
| Young's modulus (GPa) | 84.7 | 81.5 | 76.6 | 83.1 | 83.1 | 83.1 | 83.1 |
| $T_{100}$ (° C.) | 1712 | 1765 | 1680 | 1720 | 1721 | 1720 | 1719 |
| $T_{35000}$ (° C.) | 1285 | 1323 | 1249 | 1304 | 1304 | 1305 | 1303 |
| $T_L$ (° C.) | 1330 | 1320 | 1260 | 1190 | 1190 | 1190 | 1200 |
| $T_{st}$ (° C.) | 791 | 718 | 724 | 762 | 763 | 762 | 760 |
| Oxygen ion concentration $V_O$ (mol/cm$^3$) | 0.0861 | 0.0857 | 0.0868 | 0.0860 | 0.0860 | 0.0860 | 0.0741 |
| Transmittance at 308 nm (%) | 75.5 | 75.4 | 75.5 | 52.4 | 47.8 | 43.2 | 56.7 |
| Transmittance at 343 nm (%) | 87.7 | 87.7 | 87.9 | 63.3 | 60.3 | 57.4 | 66.6 |
| Transmittance at 550 nm (%) | 91.1 | 91 | 91.4 | 90.1 | 91.3 | 89.2 | 91.3 |
| Thermal shrinkage rate $Y_t$ (ppm) | 2.6 | 21.7 | 16.4 | 4.9 | 5.2 | 5.4 | 4.9 |

It is clear, by comparing data of examples in Tables 1-2 with data of comparative examples in Table 3, that the method of the present invention has a remarkable effect on obtaining the glass with high ultraviolet transmittance, high strain point (high thermal resistance) and high viscosity. Through the composition, low iron, low sulfur and additional oxidizing agents, the high-viscosity glass prepared from the glass composition of the present invention has the advantages of high ultraviolet and visible light transmittance, high thermal stability, high glass forming stability, high mechanical strength, etc. The glass prepared by the method of the present invention can be applied to preparation of display devices and/or solar cells, preferably suitable for the application fields of preparation of glass substrate materials and/or glass film materials for screen surface protection of flat panel display products, glass substrate materials and/or glass materials for surface packaging and/or glass film materials for screen surface protection of flexible display products, glass substrate materials of flexible solar cells, safety glass, bulletproof glass, intelligent automobile glass, intelligent traffic display screens, intelligent shop windows, intelligent cards and tickets and glass materials for other needs with high thermal stability, high ultraviolet transmittance and high mechanical stability.

The preferred embodiments of the present invention are described in detail above, but the present invention is not limited hereto. Various simple modifications can be made on the technical solution of the present invention within the scope of technical concept of the present invention, including combinations of various technical features in any other proper modes, and such simple modifications and combinations should also be deemed as the content disclosed by the present invention and all belong to the protection scope of the present invention.

The invention claimed is:

1. An aluminosilicate glass composition, comprising based on the total molar weight of the aluminosilicate glass composition, by oxide:
   69-72 mol % of $SiO_2$;
   12-14 mol % of $Al_2O_3$;
   0-2 mol % of $B_2O_3$;
   4-7 mol % of MgO;
   4-7 mol % of CaO;
   0-2 mol % of SrO;
   3-6 mol % of BaO;
   0.5-1.5 mol % of ZnO;
   0.1-1.5 mol % of $RE_2O_3$; and
   less than 0.05 mol % of $R_2O$
   wherein RE represents rare earth elements, and R represents alkali metals.

2. The aluminosilicate glass composition according to claim 1, wherein RE represents yttrium and lanthanide, and R represents Li, Na and K.

3. The aluminosilicate glass composition according to claim 1, wherein RE represents Y, La, and Lu.

4. The aluminosilicate glass composition according to claim 1, wherein the aluminosilicate glass composition further comprises at least one clarifying agent, wherein, based on the total molar weights of all the components, the total content of the clarifying agents is 0.5 mol % or less.

5. The aluminosilicate glass composition according to claim 1, wherein, by molar percentage, $(SrO+BaO)/(MgO+CaO+SrO+BaO+ZnO+Y_2O_3+La_2O_3+Lu_2O_3) \geq 0.3$.

6. A method of preparing aluminosilicate glass, the method comprising:
providing raw materials that are required by the aluminosilicate glass composition to make the aluminosilicate glass comprising:
69-72 mol % of $SiO_2$;
12-14 mol % of $Al_2O_3$;
0-2 mol % of $B_2O_3$;
4-7 mol % of MgO;
4-7 mol % of CaO;
0-2 mol % of SrO;
3-6 mol % of BaO;
0.5-1.5 mol % of ZnO;
0.1-1.5 mol % of $RE_2O_3$;
less than 0.05 mol % of $R_2O$;
wherein RE represents rare earth elements, and R represents alkali metals;
mixing the raw materials to obtain a mixture M1;
adding $NH_4NO_3$ into the mixture M1 to obtain a mixture M2;
performing a melting treatment on the mixture M2;
performing an annealing treatment on the mixture M2; and
performing a machining treatment on the mixture M2, thereby preparing the aluminosilicate glass,
wherein based on 100 g of the obtained aluminosilicate glass, the addition amount of $NH_4NO_3$ is 5-15 g.

7. The method according to claim 6, further comprising: performing a secondary melting and thinning treatment on the mixture M2 as obtained after the machining treatment.

8. An aluminosilicate glass prepared by the method of claim 6.

9. The aluminosilicate glass according to claim 8, wherein:
a content of sulfur element, represented in the form of elemental sulfur S, in the aluminosilicate glass is less than 100 ppm;
a content of iron oxide, represented in the form of $Fe_2O_3$, in the aluminosilicate glass is less than 150 ppm; and
a content of chromium oxide, represented in the form of $Cr_2O_3$, in the aluminosilicate glass is less than 50 ppm.

10. The aluminosilicate glass according to claim 8, wherein:
an oxygen ion concentration $V_o$ of the aluminosilicate glass is 0.08 mol/cm$^3$ or more; and $$V_o = [(2*N_{Si}+3*N_{Al}+3*N_B+N_{Mg}+N_{Ca}+N_{Sr}+N_{Ba}+N_{Zn}+3*N_{NH4}+3*N_Y+3*N_{La}+3*N_{Lu})/(N_{Si}+N_{Al}+N_B+N_{Mg}+N_{Ca}+N_{Sr}+N_{Ba}+N_{Za}+N_Y+N_{La}+N_{Lu})]/(m_o/\rho),$$

wherein, based on 100 g of the obtained aluminosilicate glass:
$N_{Si}$, $N_{Al}$, $N_B$, $N_{Mg}$, $N_{Ca}$, $N_{Sr}$, $N_{Ba}$, $N_{Zn}$, $N_Y$, $N_{La}$ and $N_{Lu}$ represent the amounts of substances of $SiO_2$, $Al_2O_3$, $B_2O_3$, MgO, CaO, SrO, BaO, ZnO, $Y_2O_3$, $La_2O_3$ and $Lu_2O_3$, in the mixture M1, respectively;
$N_{NH4}$ represents the amount of substance of $NH_4NO_3$ added into the mixture M1;
$m_o$ represents the mass of the aluminosilicate glass obtained after applying the melting treatment to the mixture M2, and has a unit of g; and
$\rho$ represents the density of the obtained aluminosilicate glass, and has a unit of g/cm 3.

11. The aluminosilicate glass according to claim 10, wherein the oxygen ion concentration $V_o$ of the aluminosilicate glass is 0.086 mol/cm 3 or more.

12. The aluminosilicate glass according to claim 8, wherein:
a temperature $T_{100}$ corresponding to 100 P viscosity of the aluminosilicate glass is 1680° C. or more;
a strain point $T_{st}$ of the aluminosilicate glass is 740° C. or more; and
a liquidus temperature TL of the aluminosilicate glass is 1240° C. or less.

13. The aluminosilicate glass according to claim 8, wherein:
a density of the aluminosilicate glass is 2.75 g/cm 3 or less;
a coefficient of thermal expansion of the aluminosilicate glass at 50-350° C. is less than $40 \times 10^{-7}$/° C.;
a Young's modulus of the aluminosilicate glass is greater than 80 GPa.

14. The aluminosilicate glass according to claim 13, wherein:
a temperature of the aluminosilicate glass $T_{100}$ corresponding to 100 P viscosity is in the range of 1690-1800° C.;
a temperature of the aluminosilicate glass $T_{35000}$ corresponding to 35000 P viscosity is in the range of 1250-1350° C.;
a strain point of the aluminosilicate glass $T_{st}$ is in the range of 740-765° C.; and
a liquidus temperature of the aluminosilicate glass $T_L$ is less than 1220° C.

15. The aluminosilicate glass according to claim 13, wherein:
a transmittance of the aluminosilicate glass at the wavelength of 308 nm is 72% or more;
a transmittance of the aluminosilicate glass at the wavelength of 343 nm is 84% or more; and
a transmittance of the aluminosilicate glass at the wavelength of 550 nm is 91% or more.

16. The aluminosilicate glass according to claim 13, wherein a thermal shrinkage rate of the aluminosilicate glass $Y_t$ under the condition of 600° C./10 min is less than 10 ppm.

17. The aluminosilicate glass according to claim 13, wherein:
a density of the aluminosilicate glass is less than 2.7 g/cm$^3$;
a coefficient of thermal expansion at 50-350° C. is less than $39.5 \times 10^{-7}$/° C.; and
a Young's modulus is greater than 83 GPa.

* * * * *